July 3, 1951 H. F. BRYAN 2,558,928
RESILIENTLY MOUNTED OPERATOR'S STATION FOR TRACTORS
Filed April 20, 1946 3 Sheets-Sheet 3
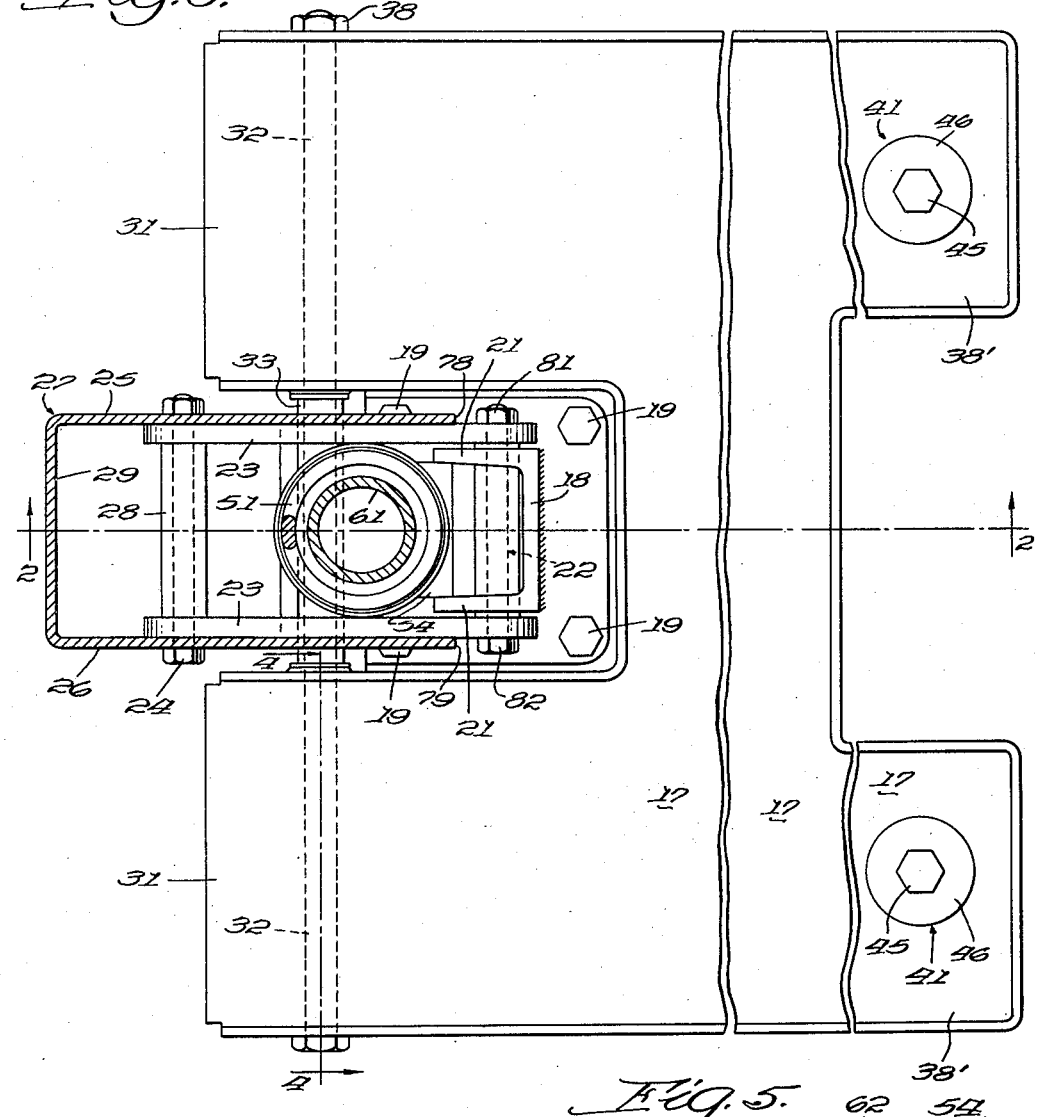
Inventor:
Harry F. Bryan Patented July 3, 1951

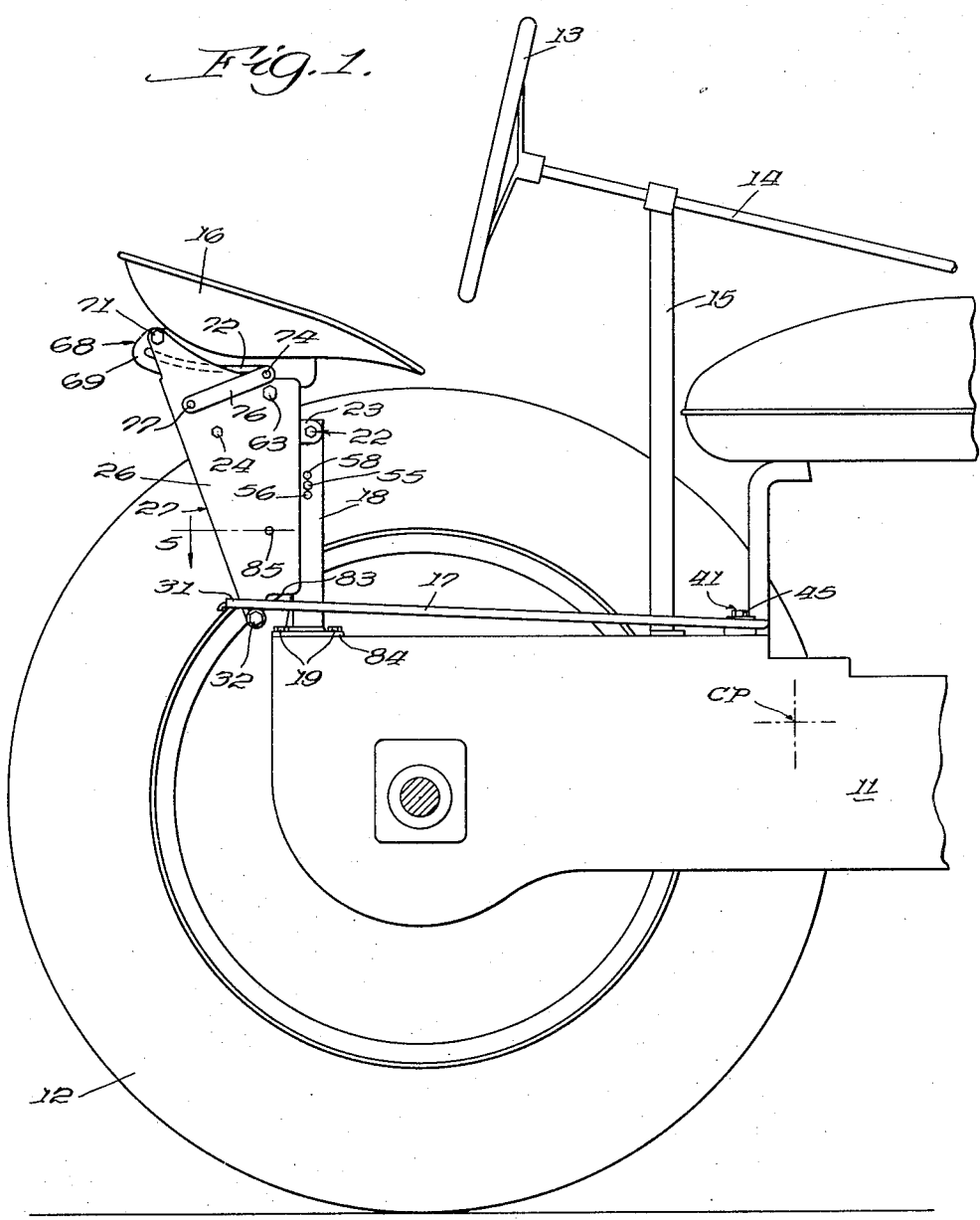

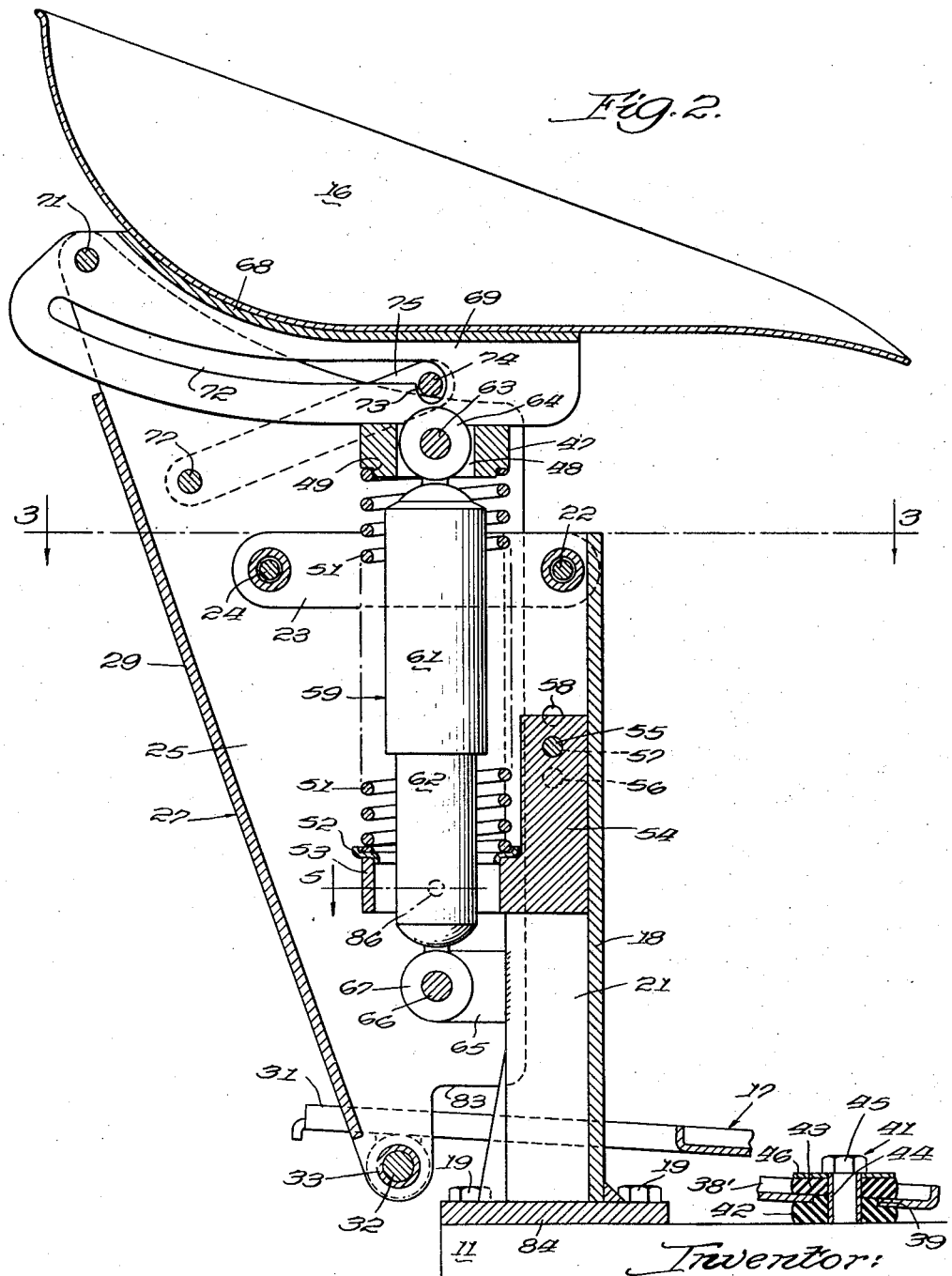

2,558,928

UNITED STATES PATENT OFFICE 2,558,928

RESILIENTLY MOUNTED OPERATOR'S STATION FOR TRACTORS

Harry F. Bryan, Chicago, Ill., assignor to International Harvester Company, a corporation of New Jersey Application April 20, 1946, Serial No. 663,648

9 Claims. (Cl. 155—9)

This invention relates to operator supporting stations on tractors or the like, and more particularly concerns a station in which both a seat-supporting structure and a foot rest platform are resiliently mounted to cause concerted movement thereof with improved riding comfort to the operator.

An important object of this invention is the provision of a tractor operator's station wherein a foot rest platform is resiliently mounted as well as the seat to diminish distortions and vibrations in the operators's body whether the operator is seated or standing on the platform during vehicle operation.

A further object is the provision of a seat and platform mounting employing a common spring support.

Another object is the provision of a resiliently mounted platform having foot rest portions at the two sides of the seat to accommodate a standing operator's feet while the seat is moved aside to afford clearance for the operator's legs.

Still another object is the provision of a resiliently mounted platform which serves as part of a parallel linkage for maintaining a substantially even keel of the seat while the latter moves up and down in service.

These and other desirable objects inherent in and encompassed by the invention will be more readily apparent upon reading the ensuing description with reference to the annexed drawings, wherein:

Figure 1 is a side elevational view of the rear end of a wheel tractor with the wheel nearest to the observer removed to expose in side elevation an operator's support constructed according to the present invention.

Figure 2 is a vertical sectional view taken through the operator's support apparatus of Figure 1 at the position indicated by the line 2—2 in Figure 3.

Figure 3 is a horizontal sectional view taken on the line 3—3 of Figure 2.

Figure 4 is a fragmentary sectional view taken on the line 4—4 of Figure 3.

Figure 5 is a fragmentary sectional view taken on the line 5 in Figures 1 and 2.

With continued reference to the drawings, a tractor upon which the apparatus constituting an embodiment of the invention is mounted has a fore and aft extending body 11 supported by traction wheels 12 at its rear end and propelled by an engine, not shown, upon its front end. A steering wheel 13 of the vehicle has its steering shaft 14 supported upon a post 15 of which the lower end is suitably secured to the tractor body.

In addition to the steering wheel 13, the station for the operator of the tractor includes a seat 16 and a platform 17, both of which are yieldably supported. Support for the seat 16 and for the rear end of the foot rest platform includes an upright standard 18 having a footing flange attached to the body of the tractor by bolts 19. The standard 18 is U-shaped in horizontal section as can be seen in Figure 3 where two flanges 21 of the standard are illustrated in a rearwardly turned direction.

Near the upper end of the standard 18 a bolt 22 passes through the flanges 21 to serve as a pivotal support for a pair of links 23 disposed exteriorly of and alongside said flanges in a rearwardly extending direction for pivotal connection with a bolt 24 which extends through and is anchored in two forwardly extending portions 25 and 26 of a seat-supporting shroud structure 27. Displacement of the links 23 toward or away from one another is prevented by the shroud walls 25 and 26 and a spacer sleeve 28 which surrounds the shank of the bolt 24. Said forwardly extending side wall portions 25 and 26 are formed integrally with a rear wall 29. The links 23 serve as a connection between the shroud-like seat-supporting structure 27 and the standard while facilitating up and down movement of such structure.

A connecting means complemental to the links 23 for stabilizing the seat-supporting structure is constituted by the platform 17 which has rearwardly projecting foot rest portions 31 on opposite sides of the standard 18 for pivotal connection with a long bolt 32 which is carried by and extends through the lower ends of the seat supporting structure walls 25 and 26. Said lower ends of the walls 25 and 26 also carry a bearing sleeve 33 (see Figures 2 and 4) in which the bolt 32 is freely rotatable.

Each platform extension 31 is provided with a pair of coaxial rings 34 secured to its underside, preferably by welding, and these rings are assembled about the bolt 32 by being mounted upon rings 35 having tapered exterior peripheries bearing against correspondingly tapered inner peripheries of the rings 34. Rings 35 are assembled onto the shank of bolt 32 together with washers 36 and spacer sleeves 37 so that when the nut 38 of the bolt is tightened the rings 35 will be forced firmly into engagement with their associated rings 34, whereby the bolt is rigidly assembled with the platform and relative movement occurs only between that portion of the bolt within the journal sleeve 33 incident to relative pivotal movement of the platform and the seat-supporting structure.

Forwardly projecting portions 38' at the forward end of the platform 17 are provided with holes 39 (see Figure 2) for the reception of anchorage means 41 for connecting the forward end of the platform with the tractor body. Such anchorage means includes a cushion structure wherein there is a pair of rubber rings 42 and 43. These rings 42 and 43 are assembled within and about their associated openings 39 of the platform extension and are carried upon respective sleeves 44 and clamped in position by means of stud bolts 45 and washers 46. The distortable character of the rubber bushing structure 42—43 facilitates up and down motion of the rear end of the platform with the seat-supporting structure 18.

The upper end of the seat-supporting structure carries a transverse bar 47 (Figure 2) which extends between and is secured to the side wall portions 25 and 26. Said bar 47 has a hole 48 therein and coaxially with this hole there is formed a circular shoulder 49 on the lower face of the bar. This shoulder 49 serves as a retaining boss for the upper end of a helical compression spring 51 which has its lower end resting upon a spring seat member 52, which in turn is mounted upon an apertured portion 53 of a spring reaction member 54 mounted on the standard 18 for vertical adjustment thereon. A bolt 55 mounts the spring reaction member 54 on the stand and by placing said bolt selectively in vertically spaced openings 56, 57 and 58 in the standard, the height of said spring reaction member can be selectively varied.

A shock absorber unit 59 comprising upper and lower telescopic parts 61 and 62 is assembled coaxially within the spring 51. The upper end of the telescopic part 61 is pivotally connected with the seat-supporting structure 27 by means of a bolt 63 and a ring 64 on the upper end of such part. A similar connection is made between the lower part of the shock absorber unit and the standard 18 by a bracket 65 on such standard, a pivot bolt 66 and a ring 67 on the lower end of such part.

The bottom of the seat 16 is attached to a seat mounting member 68 formed of sheet metal and having a pair of laterally spaced flanges 69 which project downwardly and extend fore and aft of the vehicle. These flanges 69 are disposed respectively adjacent to the inner faces of side wall portions 25 and 26 of the seat-supporting structure and are pivotally connected with said structure by means of a long bolt 71. Each seat flange 69 has a long arcuate slot 72 with a downwardly turned end portion to form a shoulder 73. Said slots are for accommodating a latch rod 74 extending therethrough and carried in the ends of pivot arms 75 and 76 which are respectively adjacent to the outer sides of the seat-supporting structure wall portions 25 and 26. These arms 75 and 76 are pivotally mounted on a pivot rod 77 extending through the two walls 25 and 26. When the seat 16 is in its normal lowered position, as shown in Figure 2, the flanges 69 at the lower side thereof rest upon the bar 47. Also at this time, the latch bar 74 will be resting upon the upper edges of the walls 25 and 26 and in registry with the downwardly turned front end portions of the slots 72. Upward movement of the seat in a counter-clockwise direction about the pivot 71 will be prevented by the shoulder 73 abutting against the latch rod 74. It is possible, however, for the operator to pivot the seat counterclockwise by reaching beneath the seat and lifting the rod 74 above the shoulder 73 prior to executing the pivoting of the seat. Counterclockwise pivoting of the seat occurs while the slots 72 accommodate the rod 74 and the limit of pivot is finally reached when the rear ends of said slots engage the rod 74. When this occurs the seat will be in an over-center condition and out of the way of the operator so that he can conveniently stand upon the foot rest portions 31 of the platform. While so standing, the operator is protected from shock imparted to the vehicle from the ground because of the platform being suspended on the vehicle through the spring 51. When the seat is in the normal position with respect to the seat-supporting structure 27, as illustrated in Figure 2, the spring 51 serves as a shock absorbing medium for the body of a seated operator as well as for the feet of such an operator since the spring carries both the seat and the rear end of the platform.

Greater comfort is afforded the operator by attaching the front end of the platform to the tractor body adjacently to the center of pivot CP of the vehicle. This center of pivot is the point about which the vehicle has a tendency to oscillate during movement thereof and over rough terrain.

In Figure 2 the seat-supporting structure is illustrated in the position relatively to the standard 18 that prevails when a typical load is upon the seat. If the seat were vacant the spring 51 would force the seat-supporting structure upwardly and forwardly to a limit determined by stop means in the form of the front edges 78 and 79 of the side walls 25 and 26 that strike and bear respectively against the nut 81 and the head 82 of the bolt 22. The downward limit of the seat-supporting structure is determined by lower edge portions 83 of the side walls 25 and 26 striking against the base 84 of the standard 18. A heavy operator, to prevent the seat "bottoming" by the stop edges 83 abutting against the standard footing 84 when bumps are encountered by the vehicle, will adjust the bracket 54 upwardly for placing the bolt 55 in the hole 58 of the standard. This will make it necessary for the spring 51 to be compressed further before "bottoming" can occur. On the other hand, an operator of light weight, in order to obtain a more comfortable ride will adjust the bracket 54 so as to place the bolt 55 in a lowermost hole 56 so at to relax the spring from its pretensioned captive condition in between the spring reaction member 54 and the bar 47 when the upper limit of motion is limited by the abutment of the walls 25 and 26 with the bolt-head 82 and the nut 81 as explained above. An intermediate adjustment for the bracket is provided for by the hole 57 in which the bolt 55 is illustrated in the drawings.

Adjustment of the bracket 54 is facilitated by a pair of alineable holes 85 and 86 (see Figures 1, 2 and 5) respectively in the seat-supporting structure side wall 26 and the bracket 54. When it is desired to change the adjustment of the bracket 54, the operator will press downwardly upon the seat 16 to bring the hole 85 into alinement with the hole 86 whereupon an instrument such as a bolt-shank will be inserted through a hole 85 into the hole 86 for holding the spring 51 captive in a compressed condition when the press-down force is relieved from the seat 16. In this manner the seat-supporting structure 25 and the bracket 54 are locked together by the inserted bolt shank and the spring 51 so that these parts are unitarily movable incident to sliding the bracket 54 upwardly or downwardly along the standard 18 for selecting holes in which it is desired to insert the bolt 55. Subsequent to the selection and the insertion of the bolt 55, the instrument within the alined holes 95 and 86 will be removed and the spring will be released so that it can force the seat-support upwardly until its normal upward limit is reached.

Having thus described a single preferred embodiment of the invention with the view of clearly and concisely illustrating the same, I claim:

1. In an operator's support for a tractor, a standard mounted on said tractor, a seat-supporting structure adjacent to said standard, link means pivotally connecting said structure with the standard for vertical movement relatively thereto, means elastically opposing such relative movement, a platform to accommodate the feet of an operator, means pivotally supporting a portion of said platform on said seat-supporting structure, and additional supporting means on the tractor at a portion of the platform spaced from the first portion, and said additional supporting means supporting said platform in a fashion accommodating movement thereof with the seat-supporting structure.

2. In an operator's support for a tractor, a standard mounted on said tractor, a seat-supporting structure adjacent to said standard, link means pivotally connecting said structure with the standard for vertical movement relatively thereto, spring reaction means on said standard, a spring disposed between said reaction means and said seat-supporting structure to yieldingly resist downward movement of such structure, a platform to accommodate the feet of an operator, means pivotally supporting a portion of said platform on said seat-supporting structure, and additional supporting means on the tractor at a portion of the platform spaced from the first portion, and said additional supporting means supporting said platform in a fashion accommodating movement thereof with the seat-supporting structure.

3. In an operator's support for a tractor, a standard mounted on said tractor, a seat-supporting structure adjacent to said standard and connected therewith for vertical movement relatively thereto, spring reaction means on said standard, a spring disposed between said reaction means and said seat-supporting structure to yieldingly resist downward movement of such structure, shock-absorber reaction means also on said standard, a shock-absorber unit connected between the seat-supporting structure and said shock-absorber reaction means, a platform to accommodate the feet of an operator, means pivotally supporting a portion of said platform on said seat-supporting structure, and additional supporting means on the tractor at a portion of the platform spaced from the first portion, and said additional supporting means supporting said platform in a fashion accommodating movement thereof with the seat-supporting structure.

4. The combination set forth in claim 3 wherein the spring reaction means comprises an open annular seat and the spring is a helical one arranged coaxially of said seat and with an end reacting thereagainst, and wherein the shock-absorber unit is disposed coaxially within said seat and spring.

5. In an operator's support for a tractor, a standard mounted on said tractor, a seat-supporting structure adjacent to said standard and spaced horizontally from one side thereof, link means extending horizontally between portions of said standard and said structure at an elevation above the bottom of said standard and having respective pivotal connections with said portions to facilitate up and down motion of said structure while maintaining the same connected with the standard, means elastically opposing such up and down motion of the seat-supporting structure, platform connecting means on the tractor at the opposite side of said standard, and a foot rest platform pivotally connected with a lower portion of the seat-supporting structure and extending horizontally therefrom to the other side of the standard into articulate connection with said platform connecting means to facilitate tilting of the platform to accommodate up and down movement of the part thereof connected with the seat-supporting structure and capacitating said platform for cooperation with said link means in preventing substantial tilting of said structure.

6. In an operator's support for a tractor, a standard mounted on said tractor at a position spaced endwise of the tractor from a center portion thereof, a seat-supporting structure adjacent to said standard and spaced horizontally therefrom at the opposite side with respect to the tractor center portion, link means extending horizontally between portions of said standard and said structure at an elevation above the bottom of said standard and having respective pivotal connections with said portions to facilitate up and down motion of said structure while maintaining the same connected with the standard, means elastically opposing such up and down motion of the seat-supporting structure, a foot rest platform having furcations on opposite sides of the standard pivotally connected with a lower portion of the seat-supporting structure and such platform having a portion extending horizontally therefrom toward the center portion of the tractor, and means articulately connecting the horizontally extending portion of the platform with a central portion of the tractor to facilitate tilting of the platform and accommodate up and down movement of the furcations with the seat-supporting structure.

7. In an operator's support for a tractor, a standard mounted on said tractor, a seat-supporting structure adjacent to said standard and spaced laterally therefrom to one side thereof, link means extending horizontally between portions of said standard and said structure at an elevation above the bottom of said standard and having respective pivotal connections with said portions to facilitate up and down motion of said structure while maintaining the same connected with the standard, means elastically opposing such up and down motion of the seat-supporting structure, platform connecting means on the tractor at the opposite side of said standard, a platform having a broad main body portion disposed between said connecting means and the standard and foot rest portions extending from said main body portion on opposite sides of the standard, said foot rest portions being pivotally connected with a portion of the seat-supporting structure below the connection of the link means therewith, and the main body portion of the platform being tiltably connected with the tractor by said connecting means to facilitate up and down motion of the foot rest portions with the seat-supporting structure.

8. In an operator's support for a tractor having a center of oscillation between forward and rear ends thereof, a standard mounted on said tractor adjacent to the rear end thereof, a seat-supporting structure adjacently to said standard and connected therewith for vertical movement relatively thereto, a platform having a portion pivotally suspended from said seat-supporting structure and extending forwardly therefrom, and platform supporting means adjacently to said center of oscillation and in supporting relation to said platform in a fashion accommodating up and down movement of the rear portion thereof with the seat-supporting structure.

9. In an operator's support for a tractor, a standard mounted on said tractor, a seat-supporting structure adjacent to said standard and connected therewith for up and down movement relatively thereto, a spring reaction member vertically adjustable on said standard, a spring seated on said reaction member and reacting between said member and said structure to urge said structure upwardly, stop means normally limiting the distance the structure can move upwardly and causing the spring to be internally stressed while urging the reaction member downwardly, and means for releasably connecting said structure and said reaction member when the structure is pressed downwardly from said stop means for holding said spring captive during adjustment of said spring reaction member.

HARRY F. BRYAN.

REFERENCES CITED

The following references are of record in the file of this patent:

UNITED STATES PATENTS

| Number | Name | Date |
| --- | --- | --- |
| 283,803 | Moehl et al. | Aug. 28, 1883 |
| 830,702 | Farez | Sept. 11, 1906 |
| 1,960,939 | Hanson | May 29, 1934 |
| 2,298,450 | Baker | Oct. 13, 1942 |
| 2,334,922 | Gustafson | Nov. 23, 1943 |

FOREIGN PATENTS

| Number | Country | Date |
| --- | --- | --- |
| 760,883 | France | Dec. 27, 1933 |